(12) United States Patent
Wahl et al.

(10) Patent No.: US 6,415,342 B1
(45) Date of Patent: Jul. 2, 2002

(54) UNIVERSAL SERIAL BUS CONTROLLED CONNECT AND DISCONNECT

(75) Inventors: Mark A Wahl, Windsor; Mark J Jedrzejewski, Thornton; Gregory A Standiford, Loveland, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/361,952

(22) Filed: Jul. 27, 1999

(51) Int. Cl.$^7$ ............................................... G06F 13/00
(52) U.S. Cl. ...................... 710/100; 710/100; 710/313; 710/2; 710/62; 710/72
(58) Field of Search ........................... 710/2–3, 12–64, 710/72–74, 100, 300–304, 305–317

(56) References Cited

U.S. PATENT DOCUMENTS

| | | | |
|---|---|---|---|
| 5,844,086 A | * 12/1998 | Murray | 530/377 |
| 6,012,103 A | * 1/2000 | Sartore et al. | 710/8 |
| 6,101,076 A | * 8/2000 | Tsai et al. | 361/90 |
| 6,131,134 A | * 10/2000 | Huang et al. | 710/103 |
| 6,205,502 B1 | * 3/2001 | Endo et al. | 710/100 |
| 6,216,188 B1 | * 4/2001 | Endo et al. | 710/103 |
| 6,279,060 B1 | * 8/2001 | Luke et al. | 710/64 |
| 6,292,863 B1 | * 9/2001 | Terasaki et al. | 710/129 |
| 6,357,021 B1 | * 3/2002 | Kitagawa et al. | 714/41 |

FOREIGN PATENT DOCUMENTS

| | | | |
|---|---|---|---|
| WO | 99/08422 | * | 2/1999 |
| WO | 00/34878 | * | 2/2000 |

OTHER PUBLICATIONS

"Universal Serial Bus Specification"; Revision 1.1; Sep. 23, 1998.

* cited by examiner

*Primary Examiner*—Christopher B. Shin
(74) *Attorney, Agent, or Firm*—Alexander J. Neudeck

(57) ABSTRACT

A device for connection to a Universal Serial Bus (USB) signals connection and disconnection from the bus without physically removing or reinserting the USB cable. The devices system controller controls the signaling so that connection or disconnection may be signaled in a variety of situations to accomplish certain tasks. Connection signaling may be delayed until power-up reset procedures are complete to prevent the device from being polled by the host. A disconnect then a connect may be signaled to help recover from certain error conditions. The same data lines may also be used for interfaces other than the USB bus. A switched connection from a USB data line through a pull-up resistor to a positive supply voltage. The switched connection is controlled by a logic function so that it will not be connected when the power supply on the USB cable is not present. The switched connection is also controlled by a logic signal that may be supplied by the USB device's system controller.

15 Claims, 1 Drawing Sheet

UNIVERSAL SERIAL BUS CONTROLLED CONNECT AND DISCONNECT

FIELD OF THE INVENTION

This invention relates to communication between a host computer and peripherals and more particularly to connect and disconnect signaling of devices on the Universal Serial Bus (USB).

BACKGROUND OF THE INVENTION

The Universal Serial Bus (USB) is a peripheral bus specification developed by personal computer (PC) and telecommunication industry companies that brings the plug and play features of computer peripherals outside the PC box. This eliminates the need to install cards into dedicated computer slots and reconfigure the system. Personal computers equipped with USB allow computer peripherals to be automatically configured as soon as they are physically attached. This eliminates the need to reboot or run setup software. USB also allows multiple devices to run simultaneously on a computer, with dedicated hubs and peripherals such as monitors and keyboards also acting as additional plug-in sites.

The Universal Serial Bus is defined in the Universal Serial Bus Specification, revision 1.1, Sep. 23, 1998 which is hereby incorporated herein by reference. This document is available from the USB Implementers Forum web page at www.usb.org.

One aspect of the USB specification provides for the detection, by a host or hub device, of the connection and disconnection of downstream devices. This is done by the use of a 1.5KΩ pull-up resister between a positive supply voltage and one of the data lines (D+ or D−). Since the host or hub device has its D+ and D− lines terminated to ground through a 15KΩ resistor, when no downstream device is connected these lines are read as both being a logical zero. When the downstream device is connected, the 1.5KΩ pull-up resistor causes one of the data lines to be pulled to a logical one. This informs the host or hub device that a new device has been connected. The host then queries the device for more information and may reset and configure the device shortly thereafter.

The USB specification also describes two types of devices: bus-powered and self-powered. Bus-powered devices rely totally on the USB cable for power. In contrast, those that have an alternate source of power are called self-powered devices. A bus-powered device has its positive supply voltage connected as soon as it is plugged into the bus. In a self-powered device, the supply voltage may be off when the device is plugged into the USB bus. Then the power may be turned on. In both of these cases, the 1.5KΩ pull-up resistor immediately starts pulling up one of the data lines as soon as power is applied. Therefore, these devices must have completed power-up reset procedures prior to the host polling the device for information. It is possible that these devices may not have completed their power-up reset procedures and that being polled by the host will cause errors or an unstable device state. Thus, a solution that can at least provide more time for power-up reset procedures is desirable.

SUMMARY OF THE INVENTION

A preferred embodiment of the invention allows a USB device signal connection and disconnection from the bus without physically removing or reinserting the USB cable. The devices system controller controls the signaling so that connection or disconnection may be signaled in a variety of situations to accomplish certain tasks. The invention eliminates the need for a USB device to be ready prior to the insertion of the USB cable. It also eliminates the need for a USB device to complete its power-up reset procedures prior to being polled by the host. The invention also provides a USB device with the ability to reinstate normal communications by signaling a disconnect and then a reconnect so that the host device will reinitialize communications and setup of the USB device. The invention also allows the same data lines to be re-used when operating the device with a different type of interface.

The invention provides a switched connection from a USB data line through a pull-up resistor to a positive supply voltage. The switched connection is controlled by a logic function so that it will not be connected when the power supply on the USB cable is not present. The switched connection is also controlled by a logic signal that may be supplied by the USB device's system controller.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
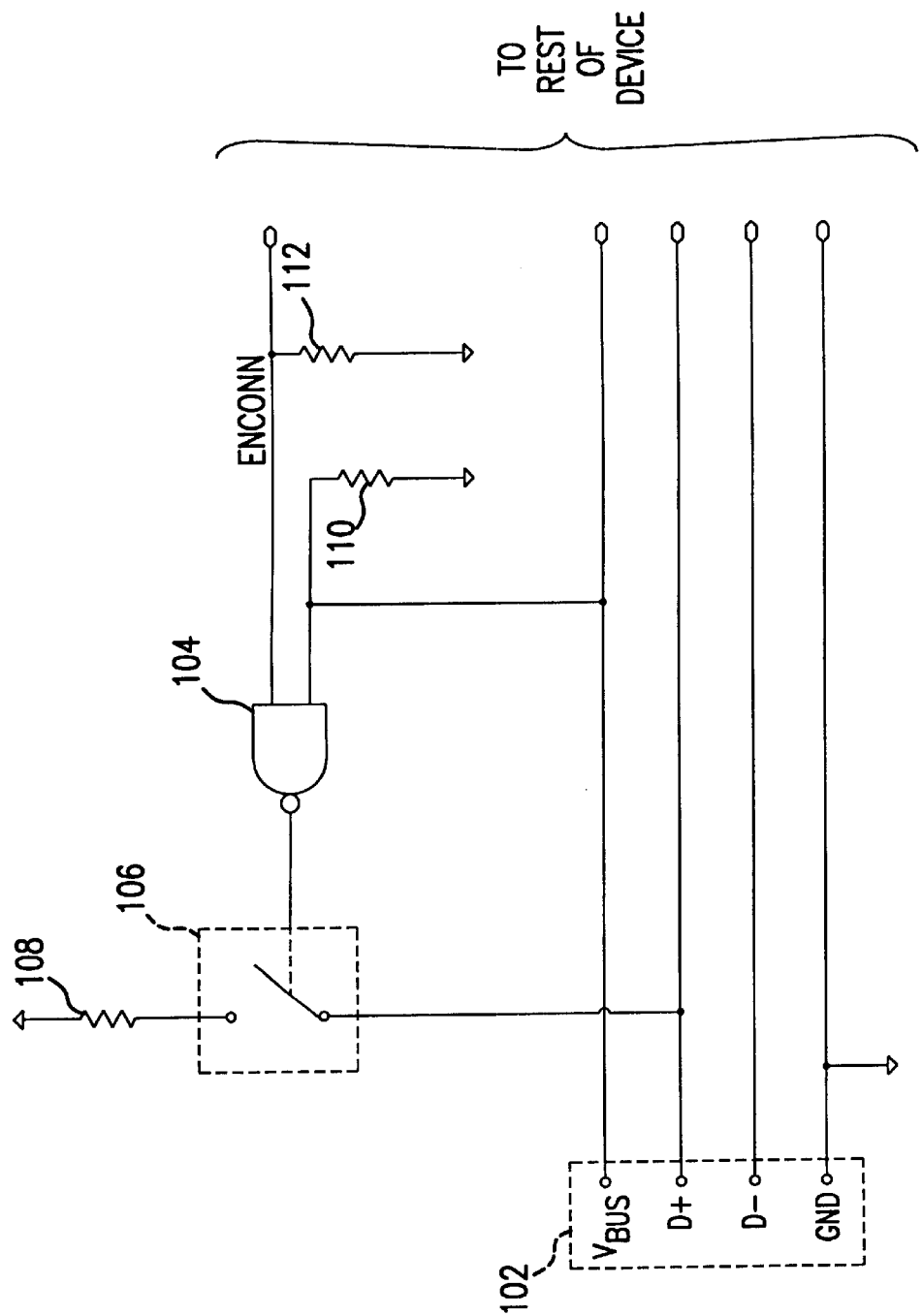
FIG. 1 is a schematic illustration of a circuit that provides controlled connect and disconnect signaling.

The preferred embodiment has a USB device signal connection and disconnection from the bus under the control of the device's system controller without physically removing or reinserting the USB cable. The ability to give these signals means the USB device does not need to have the host recognize the device until the device is ready. When the host recognizes that a new device has been connected, it quickly requests information from the device. This information includes what type of device it is, how many endpoints it contains, etc. If the device does not respond on a certain amount of time, the host assumes that the device is not functioning properly and the host does not enumerate the device. If the device has not yet completed its power-up reset, or is waiting for media to become ready, it may not be ready to send the correct information to the host. Since the USB device can control the signaling of connection and disconnection, it is able to delay the signaling of connection until it is ready to respond.

The USB device, or the host, may also get into a state where the two devices can no longer communicate properly with each other. To reestablish proper communication, it may be necessary to disconnect and reconnect the device. This may cause the host device to re-initialize, reset, or otherwise change parameters or control information that reestablishes proper communication with the device. Since the USB device can control the signaling of connection and disconnection, it is able to signal this disconnect and connect to the host without actual physical disconnection. This allows the device to recover from certain error conditions without the need for user intervention.

Self-powered USB devices may be plugged into the USB bus before their own power supplies are plugged in or are turned on. Depending on the design of the USB device, it may be possible for the power supplied by the USB cable to bleed through the device pulling up a data line. If this happens, the host will attempt to poll the device. The partially powered USB device may not respond, or may supply faulty data to the host. Since the host will typically only attempt to communicate one time, this failed first attempt will keep the host from trying to communicate with the device even after its power is on. Preventing the signaling of a connection until the self-powered device is powered up and finished with initialization procedures prevents this from happening.

A USB device may be designed to operate in both USB mode and in some other alternate interface mode that uses the same data lines. This would allow one device design to be used in several situations. For example, a device may be configured to communicate using interfaces such as IDE (Intelligent Drive Electronics), SCSI (Small Computer Serial Interface), serial port, printer port, etc. If the two USB data lines (D+ and D−) are also used on the alternate interface, the 15KΩ pull-up resistor would affect communications when the device was in the alternate interface mode. Preventing the signaling of a connection when the device is in the alternate interface mode would keep the 1.5KΩ resistor from interfering with communications.

FIG. 1 is a schematic illustration of a circuit that provides controlled connect and disconnect signaling. The USB connector on a USB device is indicated by box 102 with the USB wires $V_{BUS}$, GND, D+, and D−. All four of these wires are passed on to the device. $V_{BUS}$ is also connected to a terminal of resistor 110 and an input of two-input NAND gate 104. The other terminal of resistor 110 is connected to the negative supply voltage, GND. In the preferred embodiment, resistor 110 is a 10KΩ resistor that functions to hold the input of NAND gate 104 low when $V_{BUS}$ is not energized. $V_{BUS}$ won't be energized when the device is not connected to the USB, or when the device is powered-up before certain other devices on the USB.

The other input of NAND gate 104 is connected to signal ENCONN. ENCONN is driven low by the device to signal disconnection from the USB and driven high to signal a connection to the USB. Signal ENCONN is connected to a terminal of resistor 112. The other terminal of resistor 112 is connected to the negative supply voltage, GND. In the preferred embodiment, resistor 112 is a 10KΩ resistor that functions to hold ENCONN to a logical low when ENCONN is not being actively driven by the device.

The output of NAND gate 104 controls switching device 106. One terminal of switching device 106 is connected through resistor 108 to the positive supply voltage. In the preferred embodiment, resistor 108 is approximately 1.5KΩ and the positive supply voltage is approximately 3.3V. The other terminal of switching device 106 is shown connected to the USB signal D+. This is the proper connection for a device that is going to signal that it is a full-speed signaling device. However, this terminal of switching device 106 could also be connected to the USB signal D− if the device was to signal that it is a low-speed signaling device.

In an alternate embodiment, NAND gate 104 is omitted. In this case, ENCONN is be used to control switching device 106 directly.

In the preferred embodiment, switching device 106 is a PNP transistor with its base connected to the output of NAND gate 104, its emitter connected to resistor 108, and its collector connected to D+. However, with appropriate changes to the circuit or the polarity of the control logic, switching device 106 could also be any one of a number of switching devices such as a NPN transistor, a MOSFET, a JFET, a relay, etc.

In the preferred embodiment, the ENCONN line comes from the device's system controller. When this line is high and $V_{BUS}$ is energized high, NAND gate 104 controls switching device 106 to conduct. This pulls-up the D+(or D−) line toward the positive supply voltage signaling a connection to the USB bus. With this circuit, the USB device does not signal that it is connected until the system controller set ENCONN high and the USB cable has been connected and $V_{BUS}$ is energized. The system controller should not set ENCONN high until after reset procedures are complete and the device is ready to connect to the USB.

As stated above, a USB device may be designed to operate in both USB mode and in IDE mode and use the same data lines. To operate a device in IDE mode, the system controller should keep ENCONN asserted low. This will prevent resistor 108 from interfering with the operation of an IDE line.

From the foregoing it will be appreciated that controlled connect and disconnect from a USB bus offers numerous advantages. Controlled connect and disconnect allows a USB device to have more time to complete reset and power-up sequences. Controlled connect and disconnect also allows a USB device to signal a disconnect and then a connect to get a host device to reconfigure itself, or the USB device. This can allow the USB device to recover from some errors without the need for user intervention. Finally, controlled connect and disconnect also allows the USB device to disable a pull-up resistor so that a USB data line may be used for and IDE interface.

Although a specific embodiment of the invention has been described and illustrated, the invention is not to be limited to the specific forms or arrangements of parts so described and illustrated. The invention is limited only by the claims.

What is claimed is:

1. A USB device capable of being connected to a USB having a data line, comprising:
   a controlled pull-up coupled to said data line when said USB device is connected to said USB, and wherein a voltage on said data line signals a connect and a disconnect to said USB when said USB device is connected said USB;
   wherein said controlled pull-up can signal both said connect and said disconnect while physically connected to said USB; and
   wherein said controlled pull-up is deactivated to allow said data line to be used with an interface that is not said USB.

2. The USB device of claim 1 wherein said controlled pull-up does not signal said connect when first physically connected to said USB bus and wherein said connect is signaled under the control of a system controller.

3. The USB device of claim 2 wherein said controlled pull-up does not signal said connect until a USB power supply line is energized, said USB power supply line coming from said USB bus.

4. The USB device of claim 1 wherein said controlled pull-up signals said disconnect and then said connect to recover from an error.

5. A method of signaling a connection and a disconnection from a USB, comprising:
   controlling a pull-up coupled to a USB data line, wherein a voltage on said data line signals said connection and said disconnection to said USB;
   wherein both said connection and said disconnection ca be signaled while said data line is physically connected to said USB; and signaling said disconnection by deactivating said controlled pull-up while using said data line with an interface that is not said USB.

6. The method of claim 5 wherein said connection is not signaled when said data line is first physically connected to said USB bus and wherein said connection is signaled under the control of a system controller.

7. The method claim 6 wherein said connection is not signaled until a USB power supply line is energized, said USB power supply line coming from said USB bus.

8. The method of claim 5, comprising:
signaling said disconnection then said connection to recover from an error.

9. A USB device, comprising:
an interface, said interface coupled of connection of a USB and said interface having a data line;
a controlled pull-up coupled to said data line; and
wherein said controlled pull-up is deactivated to allow said data line to be used with an interface that is not said USB.

10. The USB device of claim 9 wherein said controlled pull-up is activated and deactivated by said USB device.

11. The USB device of claim 10 wherein said interface has a power supply line and said controlled pull-up is not activated when said power supply line is not energized.

12. The USB device of claim 9 wherein said controlled pull-up is deactivated to recover from an error.

13. The USB device of claim 9 wherein said controlled pull-up comprises:
a switching device; and,
a resistor, said resistor connected between said switching device and a positive supply voltage.

14. The USB device of claim 13 wherein said switching device is controlled by a Boolean logic function of a control signal and a power supply line energized by said interface.

15. The USB device of claim 13 wherein said Boolean logic function is a NAND gate and said switching device is a transistor.

* * * * *

UNITED STATES PATENT AND TRADEMARK OFFICE
CERTIFICATE OF CORRECTION

PATENT NO. : 6,415,342 B1
DATED : July 2, 2002
INVENTOR(S) : Mark A. Wahl et al.

It is certified that error appears in the above-identified patent and that said Letters Patent is hereby corrected as shown below:

<u>Column 4,</u>
Line 65, delete "ca" and insert therefor -- can --

Signed and Sealed this

Seventh Day of September, 2004

JON W. DUDAS
*Director of the United States Patent and Trademark Office*